(12) United States Patent
Thomson

(10) Patent No.: US 6,708,638 B2
(45) Date of Patent: Mar. 23, 2004

(54) METHOD AND APPARATUS FOR LIGHTNING PROTECTION

(75) Inventor: Ewen M. Thomson, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 10/174,844

(22) Filed: Jun. 18, 2002

(65) Prior Publication Data

US 2003/0033968 A1 Feb. 20, 2003

Related U.S. Application Data

(60) Provisional application No. 60/298,995, filed on Jun. 18, 2001.

(51) Int. Cl.$^7$ .............................................. B63B 15/00
(52) U.S. Cl. .............................................. 114/90; 174/2
(58) Field of Search .................. 114/343, 90; 244/1 A; 174/2

(56) References Cited

U.S. PATENT DOCUMENTS

| | | |
|---|---|---|
| 11,217 A | 7/1854 | Forbes |
| 2,909,589 A | 10/1959 | Booker |
| 3,483,305 A | 12/1969 | Bonkowski |
| 3,818,259 A | 6/1974 | Schleimann et al. |
| 3,919,956 A | 11/1975 | Invernizzi |
| 5,036,785 A | 8/1991 | Kittredge, Jr. et al. |
| 6,029,597 A | 2/2000 | Cutler |
| D425,481 S | 5/2000 | Cutler |
| 6,407,900 B1 * | 6/2002 | Shirakawa et al. ......... 361/117 |

FOREIGN PATENT DOCUMENTS

| | | |
|---|---|---|
| DE | 196 54 925 A1 | 4/1998 |
| GB | 2 294 666 A | 5/1996 |

OTHER PUBLICATIONS

Thomson, Ewen, "A Critical Assessment of the U.S. Code for Lightning Protection of Boats", IEEE Transactions, 1991, pp. 132–137, vol. 33, No. 2.

Dwight, H.B., "Calculation of Resistances to Ground", Electrical Engineering, 1936, pp. 1319–1328.

Petropoulos, G.M., "The High–Voltage Characteristics of Earth Resistances", National Technical University, 1947, pp. 59–60, vol. 95, Part II.

* cited by examiner

*Primary Examiner*—Jesus D. Sotelo
(74) *Attorney, Agent, or Firm*—Saliwanchik, Lloyd & Saliwanchik

(57) ABSTRACT

The subject invention pertains to a method and apparatus for lightning protection. The subject method and apparatus can be utilized to provide lightning protection for a marine vessel, other structures near water, and/or land-based structures. In a specific embodiment of the subject invention, an electrode design for allowing the electric current caused by a lightning strike to be grounded to water can be employed. The subject grounding electrodes can be employed such that the electrodes are not completely immersed in the water during normal operation of the marine vessel. In a specific embodiment of the subject invention, such grounding is not in contact with the water at all. The specific embodiment of the subject electrode is designed to enhance sparking initiation. In a specific embodiment, the subject electrode is designed to be at least partially, and in some embodiments substantially, insulate from the water, such that an area of the electrode used as a spark channel is exposed. In some embodiments, even the spark channel portion is insulated. The subject invention can incorporate an electrode geometry which enhances the local electric field so as to promote a spark connection with the water when sufficient charge accumulates in the lightning protection system. The subject electrode can then be used in place of, or in conjunction with, ground plates.

68 Claims, 6 Drawing Sheets

METHOD AND APPARATUS FOR LIGHTNING PROTECTION

CROSS-REFERENCE TO RELATED APPLICATION

The present application claims the benefit of U.S. Provisional Application No. 60/298,995, filed Jun. 18, 2001, which is hereby incorporated by reference herein in its entirety, including any figures, tables, or drawings.

BACKGROUND OF THE INVENTION

Most lightning protection systems for marine vessels are intended to provide a continuous conducting path from the point of the lightning attachment into the water in such a manner as to minimize damage to the hull, crew, and electronics. A typical marine lightning protection system has three major components namely: (i) one or more air terminals; (ii) one or more down conductors; and (iii) one or more grounding conductors, also referred to as ground, or grounding, electrodes. The air terminal is usually the highest point of the system and vessel and, therefore, where the lightning channel is likely to make its first connection to the lightning protection system on the vessel. The down conductors are connected to the air terminal and are designed to carry the bulk of the lightning current from the air terminal generally towards ground (or water). The grounding conductors are connected to the lower parts of the down conductors and are often immersed in the water so as to conduct the lightning current into the water. An example of such a system is described in American Boat and Yacht Council (ABYC) Standard E4 "Recommended practices and standards covering lightning protection" (1999).

Some of the fundamental principles of lightning protection and a discussion of some problems with an earlier edition of the lightning protection code are presented in Thomson, E. M. (1991) "A Critical Assessment of the U.S. Code for Lightning Protection of Boats" IEEE Transactions on Electromagnetic Compatibility 33(2):132–138. Ground currents are currents that flow into, and/or in, the water, usually through the ground electrodes. Sideflashes are discharges that form from conductors other than ground electrodes and frequently flow into the water. For example, sideflashes can form from conductors in the lightning system such as down conductors and bond conductors, as well as from conductors which are not part of the lightning system. Thomson, E. M. (1991) describes one origin of sideflashes as arising in response to potential gradients established in the water when the lightning current flows into the water through a grounding conductor. One serious problem identified by Thomson (1991) was the frequent occurrences of sideflashes in sail boats that were fitted with a lightning protection system. Specifically, in one sample 56% of 15 boats which were fitted with a lightning protection system and struck by lightning while in fresh water suffered from sideflashes that left holes through the hull of the boat. Thomson (1991) showed that these sideflashes could be predicted using the state-of-the-art model for voltages near a lightning ground (see as an example, Dwight, H. B. (1936), "Calculation of resistances to ground," Trans. Am. Inst. Elec. Eng., 55:1319–1328). According to this model, voltages develop in response to current flowing into a resistive ground medium. For example, voltage differences between the lightning protection system, including all conductors attached to it, and a point in the water can result from an electric field established according to Ohm's Law, $J=\sigma E$, where J is the current density, $\sigma$ is the resistivity of the water, and E is the electric field intensity. The voltage difference is then the line integral of the electric field between a point on the immersed ground conductor and the point in the water. The voltage difference between any conductor in the lightning protection system and that point in the water can be found in the same manner. If such voltage differences are sufficiently large, one or more sideflashes may develop.

As shown by Petropoulos, G. M. (1948) "The high voltage characteristics of earth resistances" JIEEE 95:59–70, the ground resistance of a single grounding conductor can be decreased if one or more sharp points are added to the grounding conductor, as sparks will form at the "strongly inhomogeneous electric field at the ends of their points". This is termed the "dynamic ground" effect. Thomson (1991) showed that a long strip conductor whose effective area is increased through the dynamic ground effect is preferable to a single ground plate. Subsequently, ABYC Standard E4 (1999), when discussing suitable geometries for a strip grounding conductor, states in E-4.9.1.2:

"NOTES: 1. The edges of the external ground plate or grounding strip need to be sharp, exposed, and not caulked or faired into the adjoining area. 2. A strip approximately one inch wide and 12 feet long has nearly six times the amount of edge area exposed to the water, which, compared to the ground plates, will improve the dissipation of charges."

There are several patents relating to lightning grounding in a boat. See, for example, U.S. Pat. No. 5,036,785 issued to Kittredge et al., which also refers to other prior art devices (U.S. Pat. No. 11,217 issued to Forbes; U.S. Pat. No. 2,909,589 issued to Booker; U.S. Pat. No. 3,483,305 issued to Bonkowski et al.; and U.S. Pat. No. 3,919,956). In addition, U.S. Pat. Nos. 6,029,597 and D425,481 issued to Cutler describes a lightning discharge strip with a "plurality of parallel grooves" to "make advantageous use of edge technology to dissipate electrical charges caused by lightning strikes".

Another device is the Strikeshield "dissipater electrode" developed by SEYLA Marine. These prior art inventions are designed to minimize ground resistance and are designed to be completely immersed, with the exception of parts used for mounting.

Another device, for transient protection, is described in U.S. Pat. No. 3,818,259 and is related to a spark gap device. Typical spark gap devices can have two or more stationary electrodes which form a spark connection when subject to a large enough voltage difference between the electrodes. This concept has also been applied to transient grounding as in the TEC100C Transient Earth Clamp manufactured by ERITECH. The TEC100C operates as an open circuit except during a lightning transient when it clamps shut.

Typically, lightning grounding systems for boats incorporate grounding conductors which are completely immersed in the water during a lightning strike, except for parts that are intended for attachment to the hull or mast. The effectiveness of such grounding conductors is gauged by ground resistance. This ground resistance may have a dynamic component. However, as Thomson (1991) points out, a single ground plate or strip may need to be supplemented by additional grounding conductors distributed over the hull surface in order to prevent sideflashes.

BRIEF SUMMARY OF THE INVENTION

The subject invention pertains to a method and apparatus for grounding or redistributing lightning charges. The subject invention can utilize the promotion of sparks from electrodes to replace, or compliment, conducting connections. In a specific embodiment, a grounding electrode can be connected to a down conductor and the electrode can be embedded in the hull of a marine vessel below the waterline. Such electrode can promote spark formation with the objective of providing protection against damaging sideflashes. The electrode can be recessed below the hull surface and can be faired into the hull to decrease drag. Such fairing can reduce galvanic or electrolytic corrosion. The shape of the grounding electrode can be designed to enhance the electric field between the electrode's tip and the water upon the lightning protection system becoming charged as a result of lightning or other atmospheric phenomenon. In operation, the electrode can preferentially launch a spark towards the water to prevent sideflashes from being initiated by other charged conductors inside or on the vessel. After the formation of a spark, the subsequent arc discharge can change the local electrical environment so as to lower the ground resistance and further decrease the likelihood of sideflashes.

In another embodiment, the subject electrode can be embedded in, and electrically connected to, a metal ballast or ground plate below the waterline, where the ballast or ground plate is electrically connected to a down conductor. The subject electrode can then promote spark formation and current flow from the ballast or ground plate into the water. In another specific embodiment, a set of two or more electrodes can enable a grounding connection to be established through a tank holding a conducting fluid such as water. One or more upper electrode(s) can be connected to a down conductor, while one or more double-ended electrode(s) can be embedded in the lower portion of the tank below the fluid in the tank.

In another specific embodiment, an electrode can be connected to a down conductor or bonding conductor and embedded in the hull above the waterline of the vessel. In a further embodiment, an electrode connected to a down conductor system can promote sparking to a rotating conductor that may be partially submerged, as for example, in the case of a propeller shaft. In an additional embodiment, an electrode can promote a spark to a bonding conductor to form a dynamic bonding connection.

DETAILED DESCRIPTION OF THE FIGURES

Figure 1A:
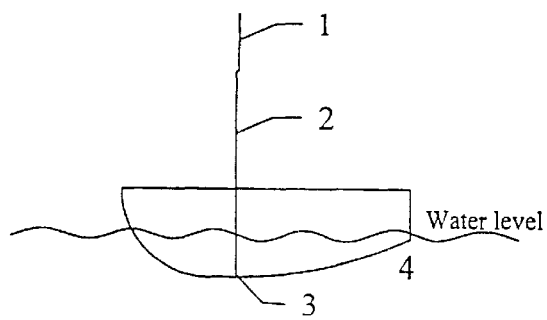
FIG. 1A shows an embodiment of the subject invention having an air terminal, a down conductor, and a grounding electrode.
Figure 1B:
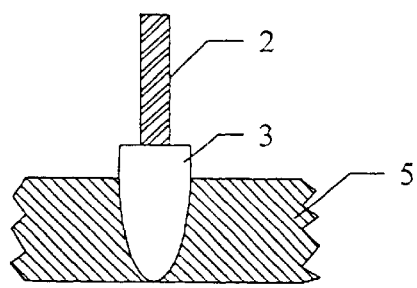
FIG. 1B shows an embodiment of the subject invention wherein the grounding electrode is located behind a contour of an outer surface of a hull of a watercraft.
Figure 1C:
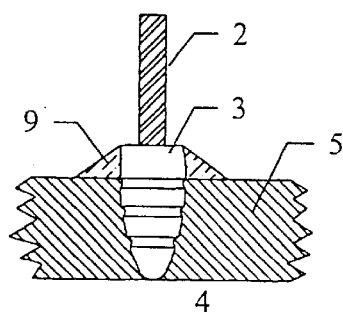
FIG. 1C shows an embodiment of the subject invention wherein the grounding electrode is located behind a contour of an outer surface of a hull of a watercraft, where the grounding has ferrules.
Figure 1D:
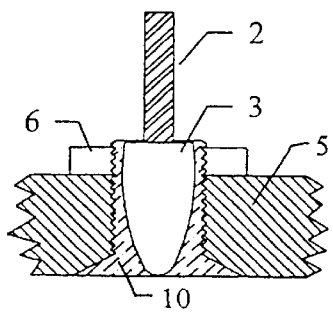
FIG. 1D shows an embodiment of the subject invention wherein the grounding electrode is located behind a contour of an outer surface of a hull of a watercraft, where a threaded insulating sleeve is positioned between the grounding electrode and the hull.
Figure 1E:
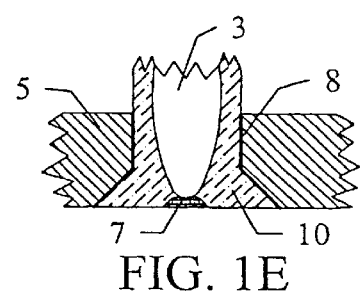

FIG. 1E shows an embodiment of the subject invention wherein the grounding electrode is located behind a contour of an outer surface of a hull of a watercraft, where an insulated sleeve is positioned between the grounding electrode and the hull, a conducting ring is positioned between the insulating sleeve and the hull, and fine conductors are positioned normally to the surface of the grounding electrode and between the grounding electrode and a contour of an outer surface of the hull.

Figure 2C:
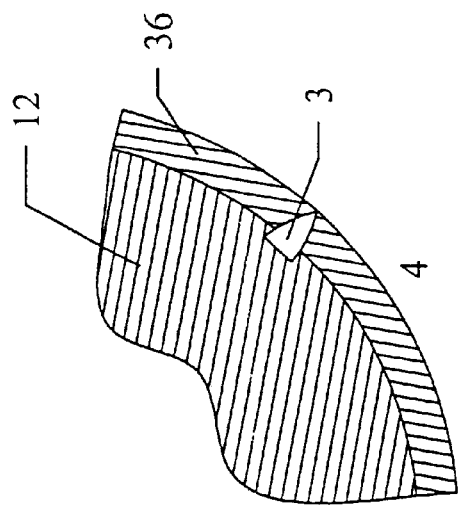
Figure 2B:
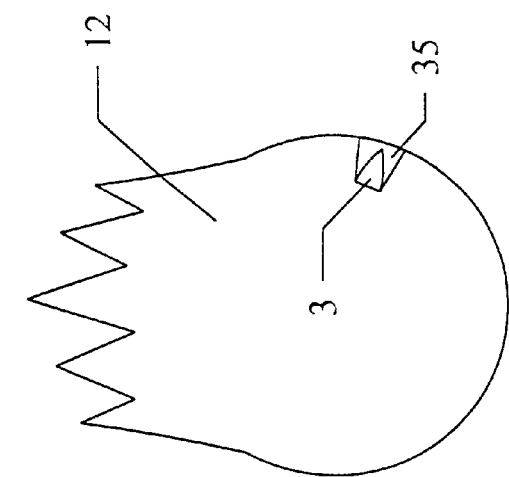
Figure 2A:
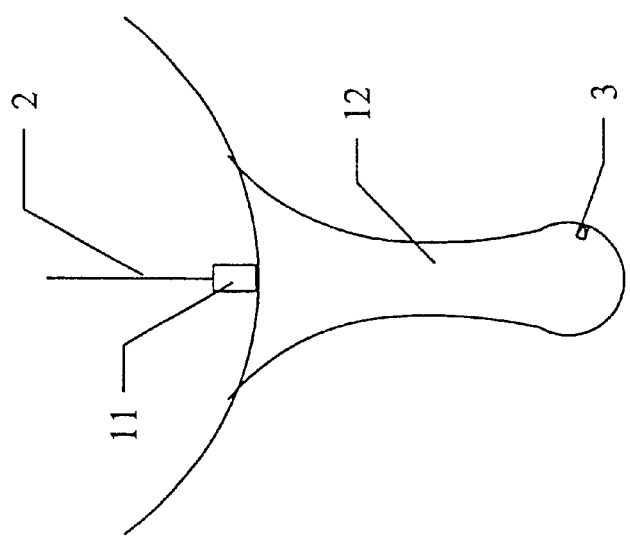

FIG. 2A shows an embodiment of the subject invention having a down conductor electrically connected to a large conductor and a ground electrode mounted to the surface of the large conductor.

FIG. 2B shows a close-up view of the embodiment of FIG. 2A.

FIG. 2C shows an embodiment of the subject invention having a grounding electrode attached to a large conductor and a non-conducting material covering the grounding electrode.

Figure 3A:
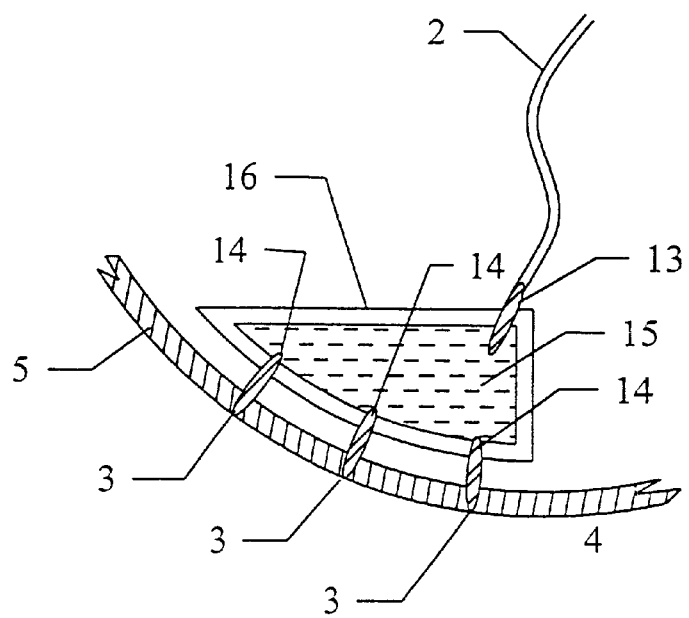

FIG. 3A shows a specific embodiment of the subject invention for protecting a tank.

Figure 3B:
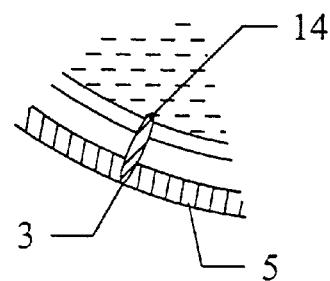

FIG. 3B shows a close-up of the electrode shown in FIG. 3A between the tank and the hull.

Figure 3C:
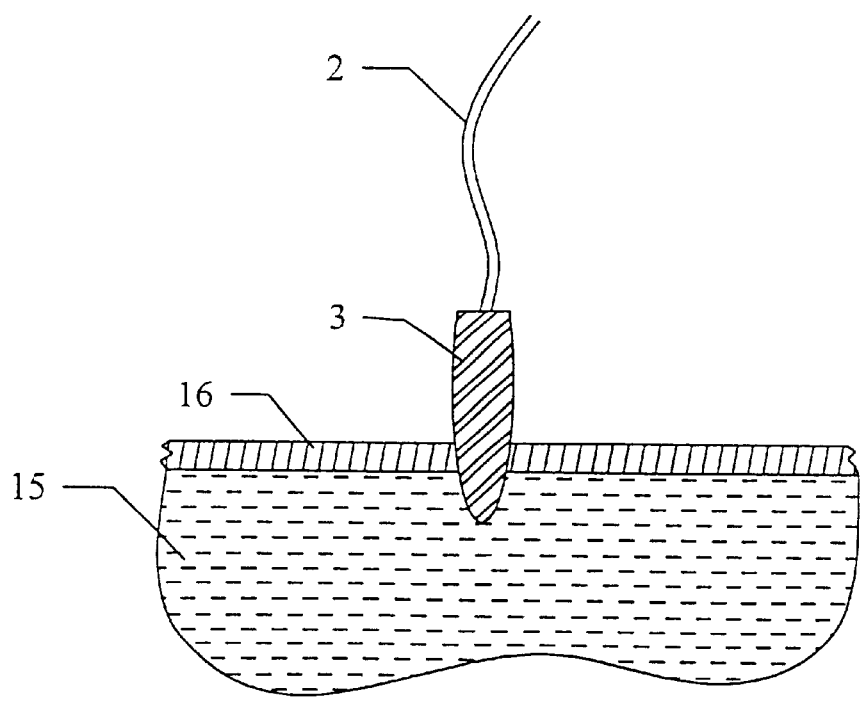

FIG. 3C shows more detail of the electrode in the upper portion of the tank in FIG. 3A.

Figure 4A:
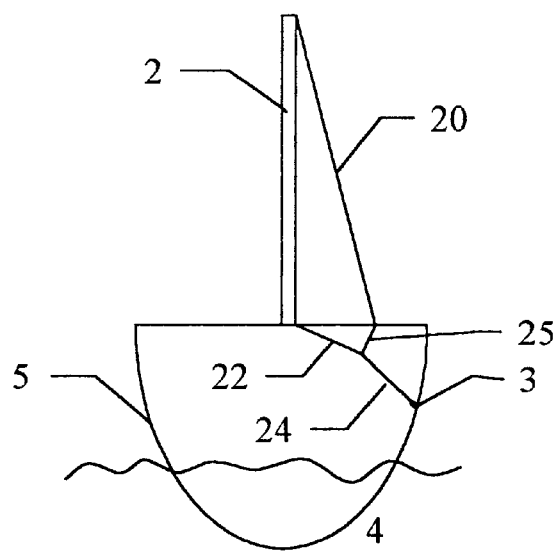

FIG. 4A shows an embodiment of the subject invention with a grounding electrode attached to a hull above the waterline.

Figure 4B:
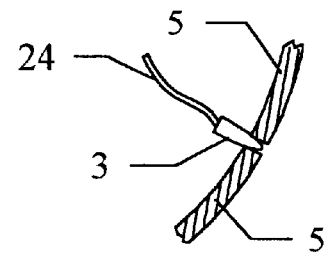

FIG. 4B shows a close-up of the grounding electrode of FIG. 4A.

Figure 4C:
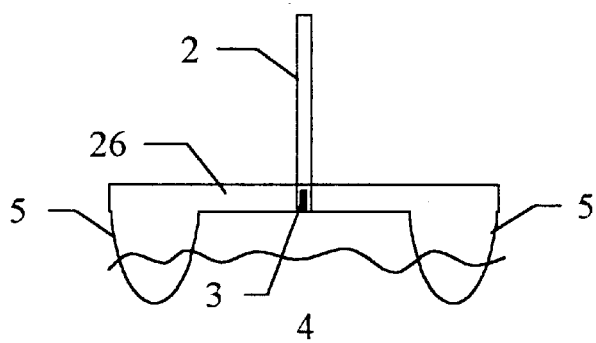

FIG. 4C shows a specific embodiment of the subject invention having a grounding electrode positioned substantially directly below the mast and above the waterline.

Figure 4D:
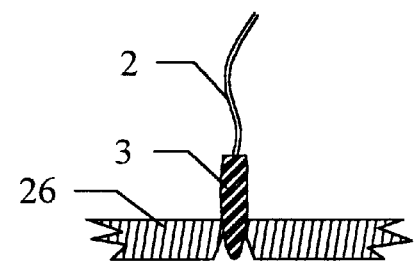

FIG. 4D shows a close-up of the grounding electrode of FIG. 4C.

Figure 4E:
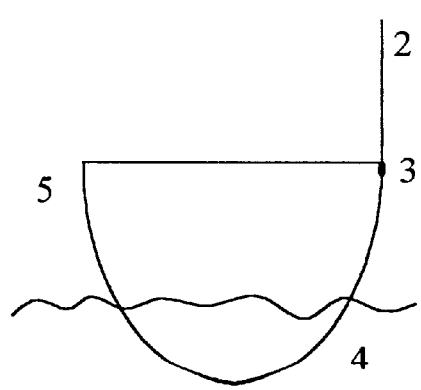

FIG. 4E shows an embodiment of the subject invention having a grounding electrode mounted on the outer surface of the hull.

Figure 5:
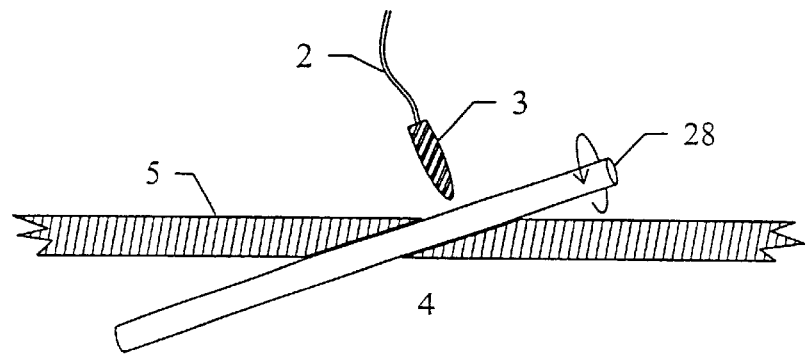

FIG. 5 shows a specific embodiment of the subject invention having a rotating conductor.

Figure 6A:
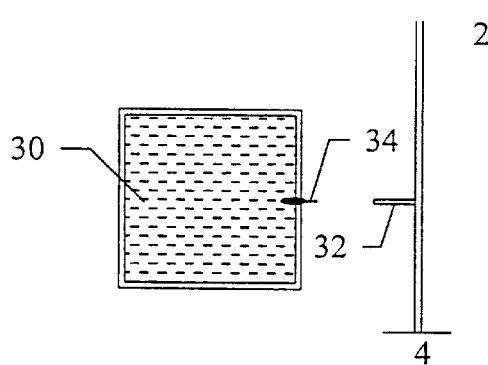

FIG. 6A shows a specific embodiment of the subject invention for protecting a tank.

Figure 6B:
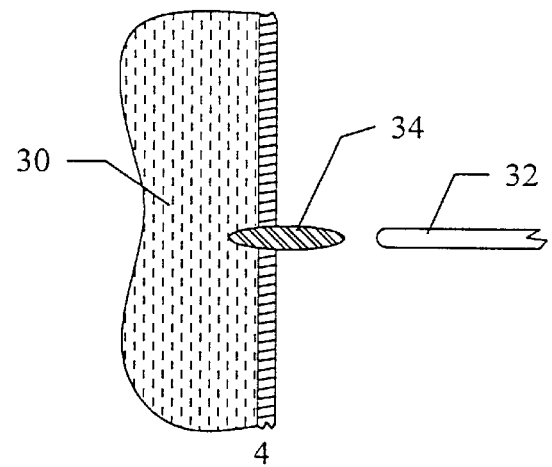
Figure 7A:
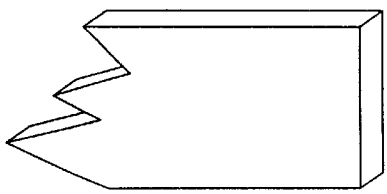
Figure 7B:
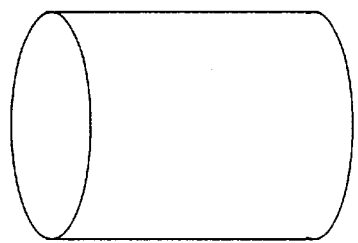
Figure 7C:
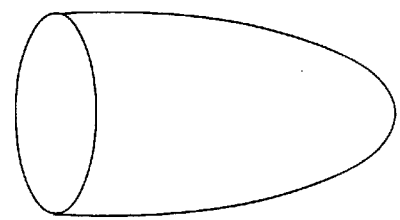
Figure 7D:
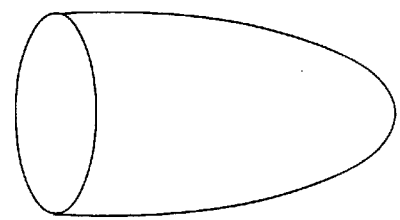
Figure 7E:
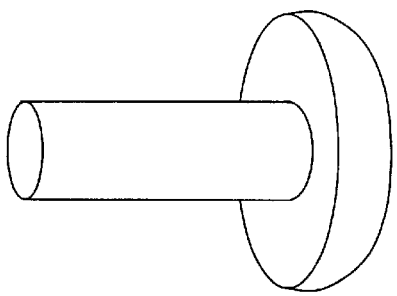
Figure 7F:
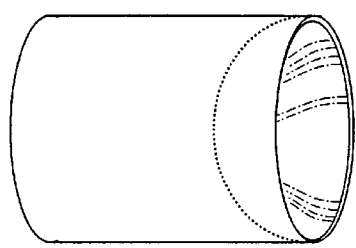
Figure 7G:
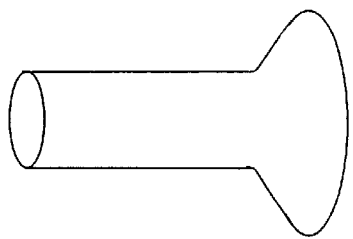

FIG. 6B shows a close-up of the electrode in FIG. 6A.

FIGS. 7A–7G show various shapes of spark channel portions of grounding electrodes which can be utilized with the subject invention.

DETAILED DESCRIPTION OF INVENTION

The subject invention pertains to a method and apparatus for lightning protection. The subject method and apparatus can be utilized to provide lightning protection for a marine vessel, other structures near water, and/or land-based structures. In a specific embodiment of the subject invention, an electrode design for allowing the electric current caused by a lightning strike to be grounded to water can be employed. The subject grounding electrodes can be employed such that the electrodes are not completely immersed in the water during normal operation of the marine vessel. In a specific embodiment of the subject invention, such grounding is not in contact with the water at all.

Examples of objects or structures which can utilize the subject method and apparatus for lightning protection, include, but are not limited to, an object in the water, watercraft, hover craft, tanks, mobile vehicle, movable structures, and low flying aircraft.

A specific embodiment of the subject electrode is designed to enhance the initiation of discharges formed by charge accumulation that, in conjunction with the electric field enhancement, can cause a breakdown strength electric field at the surface of the subject electrode. That is, the breakdown can be caused by quasistatic charging. Such an electrode can be referred to as a field effect ground electrode. In a specific embodiment, the subject invention can incorporate an electrode geometry which enhances the local electric field so as to promote a spark connection with the water when sufficient charge accumulates in the lightning protection system. The subject electrode can then be used in place of, or in conjunction with, ground plates. The shape of the subject electrode can be such that the shape enhances the strength of the electric field at the portion of the electrode closest to the water so as to promote spark formation between the electrode and the water. In specific embodiments, spark formation can occur at a location on the electrode which is not closest to the water. For example, the portion of the electrode encompassing the location of the spark origin can have one or more points, one or more edges, and/or continuous contours. Specific examples include, but are not limited to, ellipsoid tips, conical tips, and/or various truncated tips terminated with polygonal, oval, or ellipsoidal cross-sections. FIG. 7 shows a number of specific shapes of spark channel portions of electrodes which may be utilized with the subject invention. Preferably, the portion of the subject electrode closest to the water is closer to the water than other conductors in the lightning protection system to the water. It may also be preferable for the portion of the subject electrode which is closest to the water to be closer to the water than conductors not in the lightning protection system.

In a specific embodiment, the subject electrode is designed to be at least partially, and in some embodiments substantially, insulated from the water, such that an area of the electrode used as a spark channel is exposed. In some embodiments, even the spark channel portion is insulated. In some embodiments of the subject invention, one field effect ground electrode is utilized at each termination of the grounding end. In other embodiments additional electrodes can be added between the electrode at the termination and a down conductor or bonding conductor, so that the final spark forms from the field effect ground electrode and either the ground medium or another conductor.

In a specific embodiment of the present invention, a grounding conductor is replaced by a field effect ground electrode that functions by promoting a spark to make the connection to ground. In a specific embodiment, the field effect ground electrode of the subject invention is not immersed in the water. In another embodiment, the surface area of the subject field effect ground electrode in contact with the water can be much less than one square foot, for example less than about 1000 $mm^2$. In other specific embodiments, the surface area of the subject field effect ground electrode in contact with the water can be less than about 500 $mm^2$, less than about 200 $mm^2$, less than about 100 $mm^2$, less than about 50 $mm^2$, and less than about 25 $mm^2$, and in a further embodiment, less than about 5 $mm^2$. In addition, the subject field effect ground electrode can have its lowest extremity interior to the hull surface. The subject electrode can be attached to the extremity of a down conductor and can be partially or wholly embedded in the hull. The subject electrode functions as a conducting conduit for current flow. The subject electrode's shape can be designed to promote a breakdown electric field at the electrode's extremity closest to the water when the electrode is charged through, for example, the down conductor. Thus, the subject electrode can form a spark from a point in the lightning protection system that might otherwise be vulnerable to a sideflash through the hull. In a specific embodiment, the spark is not a secondary vehicle for reducing ground resistance, as in the case of a dynamic ground, but can be the primary activator. In this and other embodiments of the invention, a grounding connection can be made in a manner similar to a spark gap, except at least one electrode at the extremity of the grounding electrode is singular rather than one electrode of an electrode pair.

EXAMPLE 1

Electrode Embedded in Hull Below Waterline

The desirability of multiple ground plates has been demonstrated in Thomson (1991) but the prevalence of large metal fittings inside the typical large boat means that it is preferred to incorporate many ground plates. Given the reluctance of builders and sailors to fasten multiple ground plates to the outside of their hulls, compliance can be low unless there is already an existing through-hull conductor such as a metal seacock. In this example, the subject field effect ground electrode can be used instead of a conventional ground plate or strip attached to the outside of the hull. FIG. 1A shows the relationship of the subject grounding electrode 3 to the other connected components, air terminal 1 and down conductor 2, in a lightning protection system in accordance with the subject invention where the grounding electrode is positioned below the waterline during normal operation. There can be multiple air terminals 1, down conductors 2, and/or grounding electrodes 3. In addition, there can be other grounding surfaces which are completely immersed. In this regard the subject grounding electrode can serve the function of conventional ground plate.

FIG. 1B is a magnified view of a portion of FIG. 1A and shows the grounding electrode 3 embedded in the hull 5 and connected to a down conductor where the grounding electrode 3 points toward the water 4. The connection between down conductor 2 and grounding electrode 3 can use state-of-art technology such as crimping, clamping, or a separate connector. Note that the electrode 3 shown in FIG. 1B is embedded in the hull 5 and its end closest to the hull's outer surface is to the hull side of the hull's outer surface/water interface. This enables the grounding electrode 3 to be faired into the hull 5 to reduce drag, inhibit galvanic and electrolytic corrosion, and lower the chance of water seepage into the hull. If desired, the grounding electrode 3 can protrude from the hull's outer surface.

FIG. 1C shows how grooves or ferrules in the electrode may be useful in promoting a strong attachment of the electrode to the hull when the electrode is included in the original hull layup or attached, for example using epoxy 9, after the hull has been removed from its mold. In addition, additional epoxy 9 or other attaching compound can be used to reinforce the attachment between the electrode and the hull. Alternatively, the outer surface of the electrode may be grooved or roughened to improve adhesion.

FIG. 1D shows an embodiment which results in a strong compressional attachment of the grounding electrode 3 to the hull 5. A single countersunk hole can be made from the outside surface of the hull, and an insulating sleeve 10 bonded to the conducting core of the electrode to give a cylindrical outer surface with a thread. A mating nut 6 can then be used to mount the whole device securely into the hull. The insulating sleeve 10 can provide an insulating gap between the electrode core and the hull material. Such an insulating gap can be desirable with, for example, a composite hull with carbon fiber content as the carbon fibers are at risk of developing discharges.

In the embodiment shown in FIG. 1E, an additional conducting ring 8 on the outer surface of insulating sleeve 10 can be used. Conducting ring 8 can be useful for shorting out longitudinal electric field components inside the carbon fibers. Conducting ring 8 is preferably incorporated between the insulating sleeve 10 and the hull material 5 when the hull material is carbon fiber composite or other partially conducting material. In the embodiments shown in FIGS. 1A, 1B, 1C, and 1D a discharge from the electrode can cause heating of the insulating material between the electrode extremity and the water. This heating can cause the insulating material to explode and leave a small hole having, for example a diameter of a few millimeters. In the embodiment shown in FIG. 1E, fine conductors such as carbon fibers can be incorporated to facilitate such an explosion. The fine conductor fibers can be oriented normally to the electrode surface to form the outer surface of a fusable cone-shaped plug 7. Insulating fairing compound can be used to form the inner volume of the plug 7. After a lightning strike, any holes left behind can indicate that the system has worked and can easily be repaired. In addition, the creation and refairing of all the holes should not seriously degrade electrode performance for subsequent strikes.

EXAMPLE 2

A typical lead or iron keel has an intentionally smooth surface that is not conducive to initiating grounding discharges into the water because of the low electric field enhancement. The subject invention can incorporate one or more grounding electrodes embedded into an immersed conductor such as a keel, a metal hull, a flat ground plate, or other smooth conductor which may be used as a grounding conductor. The subject invention can also incorporate one or more grounding electrodes connected or attached to a grounding conductor or metal keel that is encapsulated in fiberglass or other nonconducting or poorly conducting material. FIG. 2C shows an electrode 3 electrically connected with a metal keel 12 and having a nonconducting material 36 covering the electrode 3 such that the electrode is not in contact with the water. For example, one or more electrodes 3 can be inserted into a hole as shown in FIG. 2B or made fast to the surface of the keel or ground plate using a conductive fastening of some type. The embedded electrode 3 can provide localized electric field enhancement and hence promote spark formation and current flow.

FIG. 2A shows a down conductor 2 connected to a conducting keel 12 via the traditional attachment point of the keel bolts 11 or other connection. Electrodes 3 can also be embedded to other immersed conductors which can be incorporated into the grounding system. The down conductor 2 can be attached to some part 11 of the immersed conductor 12 such as the keel bolts on a keel. As shown in more detail in FIG. 2B, the grounding electrode 3 can be embedded into a hole in the immersed conductor 12. In a specific embodiment, a hole 35 can be made in the immersed conductor 12 with rounded or countersunk edges at its outer edge. The grounding electrode 3 can then be inserted into this hole 35 and made fast using, for example, a conductive fastening of some type. In a specific embodiment, a portion of the surface of a keel, metal hull, flat ground plate, or other smooth conductor can be removed to leave behind a "grounding electrode" which is integral with the keel, metal hull, flat ground plate, or other smooth conductor. Such a grounding electrode can be similar to the grounding electrode shown in FIG. 2B and can be made with, for example, a router. Preferably, nonconducting fairing compound can then be placed around the electrode to fair it into the keel. In addition, a further component such as the carbon fibers and fairing compound shown in FIG. 1E can be incorporated to facilitate a fusable plug.

EXAMPLE 3

A typical water ballast tank in a sailboat is inherently insulated from the surrounding water. However, since the tank often incorporates an in-board conductor such as water below the waterline and near the hull surface, the tank can be at risk of being involved in a sideflash resulting in a breakdown in tank and/or hull integrity. In addition, making a grounding connection via ground plates, one in the ballast tank and the other on the outside of the hull nearby, is often impractical, especially if a single skin is all that separates the ballast tank from the water. FIG. 3A shows an embodiment having a down conductor 2 attached to an electrode 13 in the upper portion of the tank, and one or more electrodes 14 in the bottom of the tank. The electrodes in the bottom of the tank can then be connected to grounding electrodes 3 imbedded in the hull 5. In the embodiment shown in FIGS. 3A and 3B, a single electrode can perform the function of the lower electrode 14 and the grounding electrode 3. On charging of down conductor 2, sparks can be promoted both from the upper electrode 13 and the grounding electrode 14 to form the conducting path to the water 4. Note that the water ballast tank may be either empty, partially full, or completely full, such that the sparks inside the tank may travel through air, water, or a combination thereof. FIG. 3B shows more detail of a double-ended pointed electrode with one point 14 inside the ballast tank and the other 3 faired into the hull 5. FIG. 3C shows more detail of the upper electrode 13 inserted in the top 16 of the tank holding medium 15 inside the tank. The medium 15 in the tank can be, for example, water, air, or some other noncombustible fluid. In a specific embodiment, the lowest several mm of the electrode 13 can be exposed, such that the electrode 13 is not faired into the top 16 of the tank, and may therefore protrude into the tank. Again, attachment of electrode 13 can be accomplished by one or more of the techniques discussed above and shown in, for example, FIGS. 1B, 1C, 1D, and 1E.

EXAMPLE 4

Electrode Embedded in Hull or Attached to Hull Above Waterline

The chainplate connection between a sailboat stay and the hull can be problematic. If the chainplate is connected to the keelboats, as is commonly done, there is the risk of a sideflash from the connecting conductor to the water. However, if the chainplate is merely bonded horizontally to the mast base, as can be done to equalize potentially hazardous voltages between the two, then there is a risk of a discharge from the outer extremity of the bonding conductor, perhaps into the cabin. FIG. 4A shows an embodiment of the subject invention with an electric field-enhancement grounding electrode 3 connected at the chainplate extremity. Such an arrangement can promote a discharge via the grounding electrode 3 to the water 4 outside of the hull 5, dramatically reducing the risk of a spark inside. Referring to FIG. 4A, the mast (if functioning as down conductor) or down conductor 2 can connect with a bonding conductor 22, which also connects the down conductor 2 to the chainplate 25 which is connected to the stay 20 (which can function as a down conductor 2) and/or other metallic fittings. The bonding conductor 22 then connects with the grounding electrode 3 by another connector 24. In an alternative embodiment, bonding conductor 22 can be removed. FIG. 4B shows more detail of the grounding electrode 3 embedded into the hull 5. The grounding electrode 3 can be faired into the hull, if desired.

Referring to FIG. 4C, the subject invention can also be utilized with a catamaran type of hull 5 where it is desirable to provide a conducting path from the bridge 26 between the two main hulls 5 and the water 4. FIG. 4C shows a down conductor 2 connected to an above-water grounding electrode 3 from the bottom of the bridge 26 connecting the two hulls 5. FIG. 4D shows the grounding electrode 3 embedded in the bridge material 26 and connected to down conductor 2. In the embodiment shown in FIG. 4D, an end of the grounding electrode 3 is exposed below the bridge 26. The end could alternatively be faired into the bridge surface.

FIG. 4E shows an embodiment which has an electrode 3 mounted on the outer surface of the hull. Down conductor 2 can be connected to, or integrated into, electrode 3, and the assembly mounted, using for example fixed or swiveling mounted hardware, to the outer surface of the hull 5 at a point above the surface of the water 4.

EXAMPLE 5

Electrode Near Rotating Conductor

At least a portion of propeller shafts and/or propellers on marine vessels are often immersed in the water. These immersed metals can provide grounding surfaces. However, it is difficult, if not impossible, to connect a rotating shaft to a lightning down conductor system with a rigid connection. If a sliding connection is used, problems such as spot welding can occur. In addition, if the engine ground is electrically connected to the lightning protection system, there is a possibility of a destructive discharge through the bearings of, for example, the engine or the gearbox to the propeller shaft. Referring to FIG. 5, in a specific embodiment of the subject invention, a down conductor 2 terminating on a grounding electrode 3 near the rotating shaft 28 can be used to initiate a discharge which can close the circuit to the shaft and propeller when charged by lightning. Grounding electrode 3 can have a pointed terminal nearest the rotating shaft. FIG. 5 shows a down conductor 2 connected to a grounding electrode 3 which when charged sufficiently, can form a spark connection to rotating conductor 28. As rotating conductor 28 can be partially submerged, as in the case of a propeller shaft, rotating conductor 28 can therefore be a part of a down conductor system. As shown in FIG. 5, rotating conductor 28 can be partially immersed through the hull 5 and into the water. In another specific embodiment, grounding electrode 3 can be embedded in the hull 5, for example as taught in FIGS. 1B, 1C, 1D, or 1E, in a position near the submersed portion of he rotating shaft, such that upon a lightning strike a spark can initiate between grounding electrode 3 and the portion of rotating conductor 28 submersed in the water.

EXAMPLE 6

Spatially Separated Electrodes

Bonding conductors inside a boat, while neutralizing potential differences, can also increase the charge density on the bonded conductors compared with the case of no bonding. This additional charge may promote discharges when discharges would not otherwise form. Hence it may be desirable to make such connections only if there is a risk of an uncontrolled spark. In the case of a conducting fluid such as water in a nonconducting tank, electrical bonding can involve making an electrical connection to the water inside the tank. FIG. 6 shows an embodiment of the subject invention which incorporates what may be termed "dynamic bonding" with respect to a water tank 30. Electrode 34 can protrude into the tank with its other extremity near a down conductor 2, or bonding wire 32 connected to the down conductor 2. The down conductor 2 can then be connected to a ground plate or ground electrode 3 that forms the ground connection. If sufficiently electrically charged, electrode 34 can form a spark channel that conducts charge between the down conductor 2 and the water 30 in the tank. Such a spark channel can reduce the likelihood of uncontrolled sideflashes from the conductor 30. FIG. 6B shows in more detail the conducting fluid 30 in the tank, the electrode 34 in the tank, and an electrode 32 connected to the down conductor 2 or a bonding wire connected to the down conductor 2.

All patents, patent applications, provisional applications, and publications referred to or cited herein are incorporated by reference in their entirety, including all figures and tables, to the extent they are not inconsistent with the explicit teachings of this specification Sample and embodiments described herein are for illustrative purposes only and that various modifications or changes in light thereof will be suggested to persons skilled in the art and are to be included within the spirit and purview of this application and the scope of the appended claims.

What is claimed is:

1. An apparatus for lightning protection, comprising;
   a down conductor, and
   a grounding electrode, wherein the grounding electrode is in electrical contact with the down conductor, wherein upon a lightning strike, one or more sparks is initiated between the grounding electrode and a grounding medium, wherein the grounding electrode is not in contact with the grounding medium.

2. The apparatus according to claim 1, wherein the grounding medium is water.

3. The apparatus according to claim 1, wherein the down conductor is attached to a structure, wherein the structure is selected from the group consisting of: a marine vessel, a hover craft, a watercraft, an object in water, a tank, a mobile vehicle, a moveable structure, a low-flying aircraft.

4. The apparatus according to claim 3, wherein the structure is a water craft, wherein the grounding electrode is located behind a contour of an outer surface of a hull of the watercraft.

5. The apparatus according to claim 4, wherein at least a portion of the grounding electrode is mounted in the hull of the watercraft, wherein the grounding electrode comprises indentations, wherein the indentations enhance mounting in the hull.

6. The apparatus according to claim 4, wherein the grounding electrode is faired into the hull of the watercraft such that the faired surface approximates the contour of the outer surface of the hull.

7. The apparatus according to claim 6, wherein the grounding electrode is mounted below the resting waterline of the watercraft.

8. The apparatus according claim 6, wherein the grounding electrode is mounted above the resting waterline of the watercraft.

9. The apparatus according to claim 3, wherein the structure is a watercraft, wherein the grounding electrode is mounted above the resting waterline of the watercraft, wherein the ground electrode is mounted such that at least a portion of the grounding electrode is located outside of a contour of an outer surface of a hull of the watercraft.

10. The apparatus according to claim 1, wherein the structure is a watercraft wherein the grounding electrode is mounted within about 0.2 meters above the resting waterline of the watercraft.

11. The apparatus according to claim 1, wherein the structure is a watercraft wherein the grounding electrode is mounted within about 2 meters above the resting waterline of the watercraft.

12. The apparatus according to claim 1, further comprising:
an air terminal in electrical contact with the down electrode.

13. The apparatus according to claim 1, where upon lightning striking, sufficient electrical charge accumulates on the grounding electrode to cause initiation of the one or more sparks between the grounding electrode and the grounding medium.

14. The apparatus according to claim 1, wherein the grounding electrode comprises a spark channel portion from which the one or more sparks is initiated between the grounding electrode and the grounding medium.

15. The apparatus according to claim 14, wherein the spark channel portion of the grounding electrode is shaped so as to enhance the electric field between the spark channel portion of the grounding electrode and the grounding medium.

16. The apparatus according to claim 1, wherein the grounding electrode has a substantially circular cross-section along a primary axis.

17. The apparatus according to claim 16, wherein the cross-sectional diameter is greater than about 0.1 inch.

18. The apparatus according to claim 16, wherein the cross-sectional diameter is less than about 1 inch.

19. The apparatus according to claim 16, wherein the spark channel portion is located toward the outer surface of the hull and has a decreasing cross-sectional diameter from at least about 0.25 inch from the end of the primary axis to the end of the primary axis.

20. The apparatus according to claim 1, wherein the grounding electrode is attached to a first section a structure which is electrically conducting, wherein the ground electrode is shaped such that, upon a lightning strike, charge accumulates on the grounding electrode so as to enhance the electric field proximate the grounding electrode so as to promote electrical breakdown and current flow in the ground medium proximate the grounding electrode.

21. The apparatus according to claim 20, wherein the entire grounding electrode is located behind a contour of the outer surface of the first section of the structure which is electrically conducting, wherein the grounding electrode is faired in such that the faired surface approximates the contour of the outer surface of the first section of the structure which is electrically conducting.

22. The apparatus according to claim 21, wherein the first section of the structure which is electrically conducting in which the grounding electrode is mounted is in contact with the grounding medium.

23. The apparatus according to claim 20, wherein the grounding electrode has a substantially circular cross-section along a primary axis,
wherein the cross-sectional diameter is greater than about 0.1 inch,
wherein the cross-sectional diameter is less than about 1 inch.

24. The apparatus according to claim 1, wherein the grounding electrode is electrically connected to a chainplate of a watercraft.

25. The apparatus according to claim 1, wherein the down conductor is electrically connected to a mast of a watercraft, wherein the grounding electrode is positioned substantially directly below the mast and above the resting waterline.

26. The apparatus according to claim 1, wherein the down conductor is electrically connected to a mast of a watercraft, wherein the grounding electrode is positioned substantially directly below the mast and below the resting waterline.

27. An apparatus for lightning protection, comprising:
a down conductor, and
a grounding electrode,
wherein the grounding electrode is in electrical contact with the down conductor,
wherein upon a lightning strike, one or more sparks is initiated between the grounding electrode and a grounding medium, wherein the grounding electrode is in contact with the grounding medium, wherein the surface area of the grounding electrode in contact with the grounding medium is less than about 1500 mm$^2$.

28. The apparatus according to claim 27, wherein the surface area of the grounding electrode in contact with the grounding medium is less than about 1000 mm$^2$.

29. The apparatus according to claim 27, wherein the surface area of the grounding electrode in contact with the grounding medium is less than about 500 mm$^2$.

30. The apparatus according to claim 27, wherein the surface area of the grounding electrode in contact with the grounding medium is less than about 200 mm$^2$.

31. The apparatus according to claim 27, wherein the surface area of the grounding electrode in contact with the grounding medium is less than about 50 mm$^2$.

32. The apparatus according to claim 27, wherein the surface area of the grounding electrode in contact with the grounding medium is less than about 25 mm$^2$.

33. The apparatus according to claim 27, wherein the surface area of the grounding electrode in contact with the grounding medium is less than about 5 mm$^2$.

34. The apparatus according to claim 32, wherein the grounding electrode is attached to a first section of a structure which is electrically conducting, wherein electrical contact between the down conductor and the grounding electrode is through the first section of the structure which is electronically conducting, wherein the grounding electrode is shaped such that, upon a lightning strike, charge accumulates on the grounding electrode so as to enhance the electric field proximate the grounding electrode so as to promote electrical breakdown and current flow in the ground medium proximate the grounding electrode.

35. The apparatus according to claim 34, wherein the entire grounding electrode is located behind a contour of the outer surface of the first section of the structure which is electrically conducting.

36. The apparatus according to claim 34, wherein the grounding electrode has a substantially circular cross-section along a primary axis,
wherein the cross-sectional diameter is greater than about 0.1 inch,
wherein the cross-sectional diameter is less than about 1 inch.

37. The apparatus according to claim 27, wherein the grounding electrode has a substantially circular cross-section along a primary axis.

38. The apparatus according to claim 37, wherein the cross-sectional diameter is greater than about 0.1 inch.

39. The apparatus according to claim 37, wherein the cross-sectional diameter is less than about 1 inch.

40. The apparatus according to claim 37, wherein the spark channel portion is located toward the outer surface of the hull and has a decreasing cross-sectional diameter from at least about 0.25 inch from the end of the primary axis to the end of the primary axis.

41. The apparatus according to claim 27, wherein the grounding medium is water.

42. The apparatus according to claim 27, wherein the down conductor is attached to a structure, wherein the structure is selected from the group consisting of: a marine vessel, a hover craft, a watercraft, an object in water, a tank, a mobile vehicle, a moveable structure, a low-flying aircraft.

43. The apparatus according to claim 42, wherein the structure is a water craft, wherein the grounding electrode is located behind a contour of an outer surface of a hull of the watercraft.

44. The apparatus according to claim 43, wherein the grounding electrode is mounted below the resting waterline of the watercraft.

45. The apparatus according to claim 27, wherein the grounding electrode is electrically connected to a chain plate of a watercraft.

46. The apparatus according to claim 27, further comprising:
an air terminal in electrical contact with the down electrode.

47. An apparatus for lightning protection, comprising:
a down conductor,
a grounding electrode,
a first tank electrode and a second tank electrode, wherein
the first tank electrode is in electrical contact with the down conductor and
wherein the first tank electrode has a spark channel portion in proximity to the interior of a tank, wherein the second tank electrode is in electrical contact with the grounding electrode and wherein the second tank electrode has a spark channel portion in proximity to the interior of the tank,
wherein upon a lightning strike one or more sparks and/or current flow is initiated between the first tank electrode and the second tank electrode and one or more sparks and/or current flow is initiated between the grounding electrode and the grounding medium.

48. The apparatus according to claim 47, wherein there is a liquid within the tank.

49. The apparatus according to claim 48, wherein there is water within the tank.

50. The apparatus according to claim 48, wherein first tank electrode is in contact with the liquid within the tank.

51. The apparatus according to claim 47, wherein the walls of the tank are non-conducting.

52. The apparatus according to claim 47, wherein the grounding electrode and the second tank electrode are the same electrode.

53. An apparatus for lightning protection of a structure proximate a grounding medium, comprising:
a down conductor,
an electrode, wherein the electrode is electrically connected to the down conductor,
a rotating conductor, wherein at least a portion of the rotating conductor is immersed in water, wherein the electrode is positioned with respect to the rotating conductor such that upon a lightning strike, one or more sparks is initiated between the electrode and the rotating conductor.

54. The apparatus according to claim 53, wherein the initiated one or more sparks is between the electrode and a portion of the rotating conductor which is not immersed in water.

55. An apparatus for lightning protection, comprising:
a down conductor,
a tank electrode, wherein the tank electrode has first portion in proximity to the interior of a tank and a spark channel portion positioned outside the tank, wherein upon a lightning strike, one or more sparks is initiated between the spark channel portion of the tank electrode and the down conductor.

56. The apparatus according to claim 55, wherein the walls of the tank are conducting.

57. The apparatus according to claim 55, wherein the walls of the tank are non-conducting.

58. The apparatus according to claim 4, wherein at least a portion of the grounding electrode is mounted in the hull of the watercraft, further comprising an insulating sleeve positioned between the grounding electrode and the hull.

59. The apparatus according to claim 58, wherein the insulating sleeve is inserted into an aperture in the hull, wherein the insulating sleeve comprises a first end with a diameter larger than the aperture in the hull, wherein once inserted into the aperture in the hull the first end of the insulated sleeve prevents the insulated sleeve from inserting further into the aperture and a nut is threaded onto a threaded second end of the insulated sleeve to secure the insulated sleeve and grounding electrode to the hull.

60. The apparatus according to claim 58, wherein the insulating sleeve is threaded, wherein the insulating sleeve is threaded into a complementarily threaded portion of the hull.

61. The apparatus according to claim 60, wherein the insulating sleeve is threaded into a complementarily threaded aperture in the hull, wherein the insulating sleeve comprises a first end with a diameter larger than the threaded aperture in the hull, wherein once threaded into the aperture in the hull the first end of the insulated sleeve prevents the insulated sleeve from threading further into the aperture and a nut is threaded onto a second end of the insulated sleeve to secure the insulated sleeve and grounding electrode to the hull.

62. The apparatus according to claim 58, further comprising a conducting ring located between the insulating sleeve and the hull.

63. The apparatus according to claim 58, further comprising fine conductor fibers located between the grounding electrode and the contour of the outer surface of the hull.

64. The apparatus according to claim 63, wherein the fine conductor fibers are oriented normally to the grounding electrode surface to form an outer surface of a fusable plug.

65. The apparatus according to claim 64, further comprising insulating fairing compound within the plug.

66. The apparatus according to claim 34, wherein at least a portion of the grounding electrode protrudes past a contour of the outer surface of the first section of the structure which is electrically conducting, wherein the first section comprises an outer non-conducting layer, wherein the grounding electrode is located behind a second contour of the outer surface of the non-conducting layer.

67. The apparatus according to claim 48, wherein the second tank electrode is in contact with the liquid within the tank.

68. The apparatus according to claim 50, wherein the second tank electrode is in contact with the liquid within the tank.

* * * * *